US008811587B2

(12) United States Patent  
Decesaris et al.

(10) Patent No.: US 8,811,587 B2  
(45) Date of Patent: *Aug. 19, 2014

(54) SELECTIVELY FILTERING INCOMING COMMUNICATIONS EVENTS IN A COMMUNICATIONS DEVICE

(75) Inventors: Michael Decesaris, Carrboro, NC (US); William M. Megarity, Roxboro, NC (US); Luke D. Remis, Raleigh, NC (US); Gregory D. Sellman, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,389

(22) Filed: Apr. 11, 2012

(65) Prior Publication Data

US 2013/0272515 A1 Oct. 17, 2013

(51) Int. Cl.  
*H04M 3/42* (2006.01)  
*G06F 15/173* (2006.01)

(52) U.S. Cl.  
USPC .................................. 379/210.02; 709/224

(58) Field of Classification Search  
USPC ............... 379/210.02, 208.01, 196; 709/224  
See application file for complete search history.

(56) References Cited

U.S. PATENT DOCUMENTS

| | | | |
|---|---|---|---|
| 5,530,903 A * | 6/1996 | Calvignac et al. | 710/41 |
| 5,638,055 A * | 6/1997 | McDonald et al. | 455/512 |
| 6,301,609 B1 | 10/2001 | Aravamudan et al. | |
| 6,563,915 B1 * | 5/2003 | Salimando | 379/208.01 |
| 6,870,917 B2 * | 3/2005 | Chen et al. | 379/207.01 |
| 6,882,838 B1 | 4/2005 | Lee et al. | |
| 6,944,655 B1 | 9/2005 | Bellamy et al. | |
| 7,007,067 B1 * | 2/2006 | Azvine et al. | 709/206 |
| 7,079,857 B2 | 7/2006 | Maggenti et al. | |
| 7,233,933 B2 * | 6/2007 | Horvitz et al. | 706/21 |
| 7,352,854 B1 | 4/2008 | Silver | |
| 7,424,537 B2 | 9/2008 | Bennett et al. | |
| 7,664,853 B2 | 2/2010 | Hagale et al. | |
| 7,801,129 B2 | 9/2010 | Batteram et al. | |
| 8,191,005 B2 * | 5/2012 | Baier et al. | 715/771 |

(Continued)

FOREIGN PATENT DOCUMENTS

WO WO 2004/001558 A1 12/2003

OTHER PUBLICATIONS

Google, "Call Guard (SMS & Call Blocker)", Google Application, http://play.google.com [online], Feb. 2012, [accessed online Mar. 19, 2012], 2 pp., URL: https://play.google.com/store/apps/details?id=com.incorporateapps.callblocker&hl=en.

(Continued)

*Primary Examiner* — William Deane, Jr.  
(74) *Attorney, Agent, or Firm* — Edward J. Lenart; Katherine S. Brown; Biggers Kennedy Lenart Spraggins LLP

(57) ABSTRACT

Selectively filtering incoming communications events in a communications device, including: receiving, by a communications event filtering module, an incoming communications event; determining, by the communications event filtering module, whether the communications device is currently servicing a call; responsive to determining that the communications device is currently servicing a call, determining, by the communications event filtering module, whether the call is interruptible; and responsive to determining that the call is not interruptible, blocking, by the communications event filtering module, the incoming communications event from presentation by the communications device until the call has ended.

14 Claims, 3 Drawing Sheets

(56) References Cited

U.S. PATENT DOCUMENTS

| | | | |
|---|---|---|---|
| 2001/0003202 | A1 | 6/2001 | Mache et al. |
| 2003/0046296 | A1 | 3/2003 | Doss et al. |
| 2004/0186887 | A1 | 9/2004 | Galli et al. |
| 2004/0196315 | A1 | 10/2004 | Swearingen et al. |
| 2004/0205161 | A1 | 10/2004 | Hamilton, II et al. |
| 2005/0021651 | A1 | 1/2005 | Fellenstein et al. |
| 2005/0027669 | A1 | 2/2005 | Day et al. |
| 2005/0027839 | A1 | 2/2005 | Day et al. |
| 2006/0015609 | A1 | 1/2006 | Hagale et al. |
| 2007/0064886 | A1 | 3/2007 | Chiu et al. |
| 2007/0198696 | A1* | 8/2007 | Morris ............ 709/224 |
| 2008/0146203 | A1 | 6/2008 | Khawand et al. |
| 2008/0153432 | A1 | 6/2008 | Zhu et al. |
| 2008/0294772 | A1 | 11/2008 | Hagale et al. |
| 2010/0179998 | A1 | 7/2010 | Matteini et al. |
| 2011/0238815 | A1 | 9/2011 | Malkin et al. |

OTHER PUBLICATIONS

How-To Geek, "How Do You Block Annoying Text Message (SMS) Spam?", www.howtogeek.com [online], Jan. 2011, [accessed online Mar. 19, 2012], 6 pp., URL: http://www.howtogeek.com/howto/41123/how-do-you-block-annoying-text-message-sms-spam/.

Wikipedia, "Mobile Phone Spam", www.en.wikipedia.org [online], Feb. 2012, [accessed online Mar. 19, 2012], 5 pp., URL: http://en.wikipedia.org/wiki/Mobile_phone_spam.

Broida, "How to Block Text-Message Spam on Your iPhone (AT&T)", CNET Reviews, www.cnet.com [online] Sep. 7, 2011, [accessed online Mar. 19, 2012], 3 pp., URL: http://reviews.cnet.com/8301-19512_7-20102542-233/how-to-block-text-message-spam-on-your-iphone-at-t/.

Joseph, "Devising a Smart SMS Spam Blocker and Hoping to Make a Meal of It", Daily News & Analysis (DNA), http://www.dnaindia.com [online], Apr. 9, 2011, [accessed online Mar. 19, 2012], 2 pp., URL: http://www.dnaindia.com/money/interview_devising-a-smart-sms-spam-blocker-and-hoping-to-make-a-meal-of-it_1529858.

Ashraf, "[Android] Best Free Call, SMS (Text Message), and MMS (Picture Message) Blocker/Filter", dottech.org [online], Sep. 02, 2011, [accessed online Mar. 19, 2012], 6 pp., Url: http://dottech.org/android/best-freeapps/23216/android-best-free-call-sms-text-message-and-mms-picture-message-blocker-filter/.

Erickson, T. et al., "Socially Translucent Systems: Social Proxies, Persistent Conversation, and the Design of 'Babble'", Human Factors in Computing Systems: The Proceedings of CHI '99, ACM Press, May 15-20, 1999, 11 pages.

* cited by examiner

SELECTIVELY FILTERING INCOMING COMMUNICATIONS EVENTS IN A COMMUNICATIONS DEVICE

BACKGROUND OF THE INVENTION

1. Field of the Invention

The field of the invention is data processing, or, more specifically, methods, apparatus, and products for selectively filtering incoming communications events in a communications device.

2. Description of Related Art

There are times when a user of a communications device is on an important call and would elect not to be bothered by an incoming call-waiting call, text messages, or an electronic mail message while on their call. For example, the user may be on a corporate conference call when a friend continues to send text messages that become distracting to the user of the communications device.

SUMMARY OF THE INVENTION

Methods, apparatus, and products for selectively filtering incoming communications events in a communications device, including: receiving, by a communications event filtering module, an incoming communications event; determining, by the communications event filtering module, whether the communications device is currently servicing a call; responsive to determining that the communications device is currently servicing a call, determining, by the communications event filtering module, whether the call is interruptible; and responsive to determining that the call is not interruptible, blocking, by the communications event filtering module, the incoming communications event from presentation by the communications device until the call has ended.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
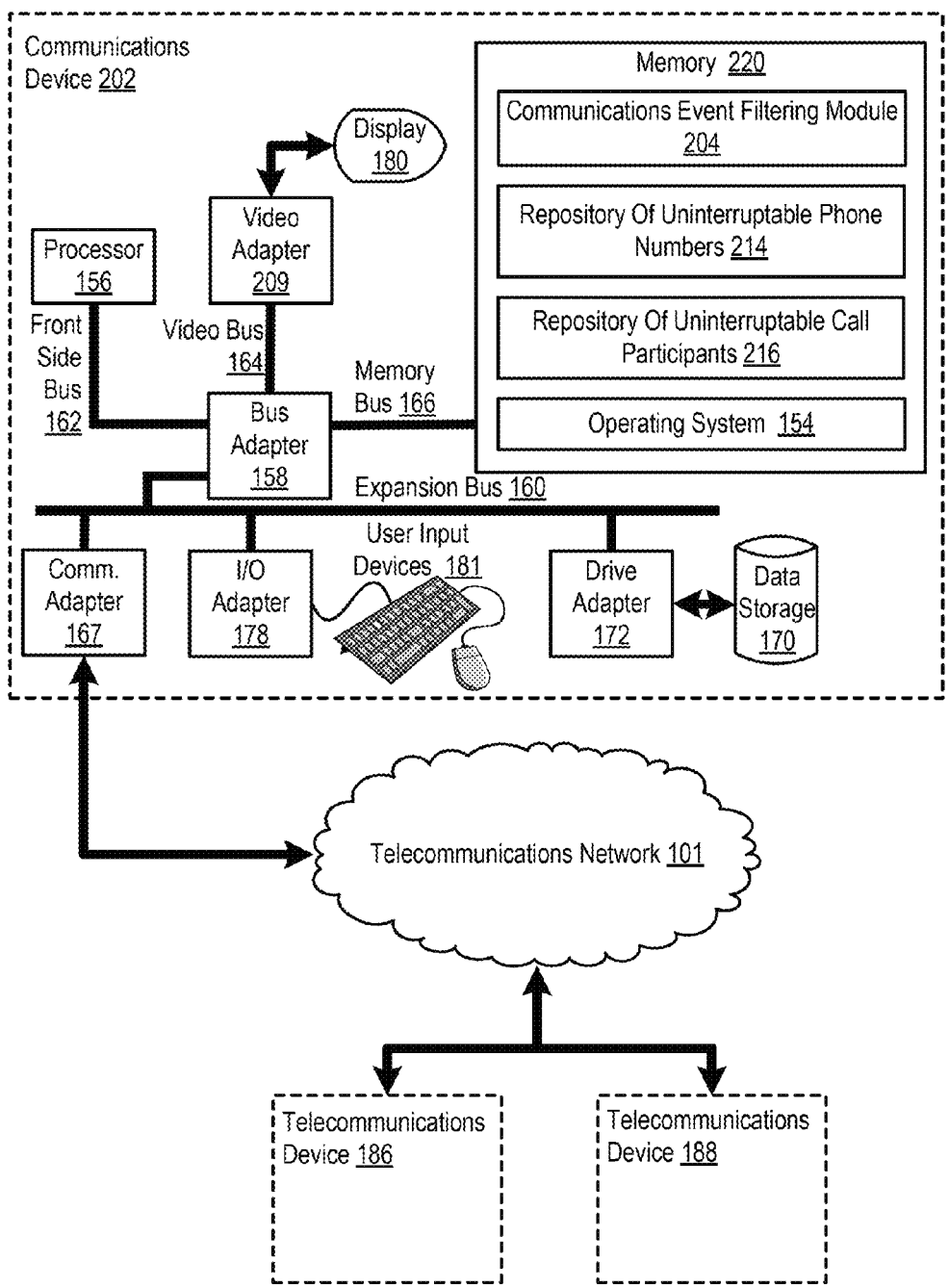
FIG. 1 sets forth a block diagram of an example communications device useful in selectively filtering incoming communications events according to embodiments of the present invention.

Example methods, apparatus, and products for selectively filtering incoming communications events in a communications device in accordance with the present invention are described with reference to the accompanying drawings, beginning with FIG. 1. FIG. 1 sets forth a block diagram of an example communications device (202) useful in selectively filtering incoming communications events according to embodiments of the present invention. The communications device (202) of FIG. 1 includes at least one computer processor (156) or 'CPU' as well as computer memory (220) which is connected through a high speed memory bus (166) and bus adapter (158) to processor (156) and to other components of the communications device (202). In the example of FIG. 1, such computer memory (220) may be embodied, for example, as a memory card, flash memory, randomly accessible memory, and so on.

Stored in the computer memory (220) is a communications event filtering module (204). The communications event filtering module (204) may be embodied, for example, as a module of computer program instructions executing on the communications device (202). The communications event filtering module (204) may be configured to receive an incoming communications event. The incoming communications event represents an attempt initiated by another device to exchange data communications information with the communications device (202). Examples of an incoming communications event can include an incoming call initiated by another telecommunications device, a short message service ('SMS') message sent from another device, an electronic mail message sent from another device, and so on. The incoming communications event may be received by the communications device (202), for example, over a data communications network such an IP-based network, a telecommunications network, and so on.

The communications event filtering module (204) may be further configured to determine whether the communications device (202) is currently servicing a call. Determining whether the communications device (202) is currently servicing a call may be carried out, for example, by setting a variable monitored by the communications event filtering module (204) to a value indicating that the communications device (202) has accepted an incoming call or has initiated an outgoing call upon acceptance of or initiation of the call. In such an example, the communications event filtering module (204) may check the value of such a variable to determine whether the communications device is being used for a phone call.

The communications event filtering module (204) may be further configured to determine whether the call is interruptible in response to determining that the communications device is currently servicing a call. A call may be 'interruptible' based on the importance of the call. For example, if a call is highly important the call may not be interruptible because the user of the communications device (202) is engaged in an important phone call and is not inclined to pause the important phone call in order to respond to the incoming communications event. If the call is not important, however, the call may be interruptible because the user of the communications device (202) is not engaged in an important phone call and may be inclined to pause or terminate the unimportant phone call in order to respond to the incoming communications event.

Determining whether the call is interruptible may be carried out, for example, by determining the importance of the call. Determining the importance of the call may be carried out through the use of a data repository stored within the communications device (202). Such a data repository may be embodied, for example, as a repository (214) of uninterruptible phone numbers. The repository (214) of uninterruptible phone numbers may be embodied, for example, as a data structure such as a table, linked list, array, or other data structure that includes one or more phone numbers. The phone numbers in the repository (214) of uninterruptible phone numbers represent phone numbers that when called, or when a call is received from, have been designated as calls that are not to be interrupted by the incoming communications event (200). Alternatively, the data repository stored within the communications device (202) may be embodied as a repository (216) of uninterruptible call participants. The repository (216) of uninterruptible call participants may be embodied, for example, as a data structure such as a table, linked list, array, or other data structure that includes one or names of people, businesses, and so on. The entries in the repository (216) of uninterruptible call participants represent call participants that when called, or when a call is received from, have been designated as calls that are not to be interrupted by the incoming communications event (200).

The communications event filtering module (204) may be further configured to block the incoming communications event from presentation by the communications device (202) until the call has ended in response to determining that the call is not interruptible. Blocking the incoming communications event from presentation by the communications device (202) until the call has ended may be carried out, for example, by sending an incoming call to voicemail or otherwise treating the incoming call as a missed call, by suppressing an alert that an SMS message has been received, by temporarily disabling notification capabilities of the communications device (202), and so on. The communications device (202) may determine that the call has ended, for example, through the use of a variable whose indicates whether the communications device (202) is being used for a phone call. For example, when a phone call terminates the communications event filtering module (204) may set such a variable to a value indicating that the communications device (202) is not being used for a phone call. In such an example, the communications event filtering module (204) may check the value of such a variable to determine whether the communications device (202) is being used for a phone call.

Also stored in computer memory (220) is an operating system (154). Operating systems useful selectively filtering incoming communications events in a communications device (202) according to embodiments of the present invention include Apple™ iOS, Palm OS, Android, Blackberry OS, UNIX™, Linux™, Microsoft XP™, AIX™, IBM's i5/OS™, and others as will occur to those of skill in the art. The operating system (154), communications event filtering module (204), repository (216) of uninterruptible call participants, and repository (214) of uninterruptible phone numbers in the example of FIG. 1 are shown in computer memory (220), but many components of such software typically are stored in non-volatile memory also, such as, for example, on a flash memory data storage (170) device.

The communications device (202) of FIG. 1 includes drive adapter (172) coupled through expansion bus (160) and bus adapter (158) to processor (156) and other components of the communications device (202). Drive adapter (172) connects non-volatile data storage to the communications device (202) in the form of disk drive (170).

The example communications device (202) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards, special purpose buttons, a touchscreen display, and so on. The example communications device (202) of FIG. 1 includes a video adapter (209), which is an example of an I/O adapter specially designed for graphic output to a display device (180) such as a display screen or touchscreen display. Video adapter (209) is connected to processor (156) through a high speed video bus (164), bus adapter (158), and the front side bus (162), which is also a high speed bus.

The example communications device (202) of FIG. 1 includes a communications adapter (167) for data communications with other telecommunications devices (186, 188) and for data communications with a telecommunications network (101). The communications adapter (167) may utilize an antenna or other device for receiving data via the telecommunications network (101).

Figure 2:
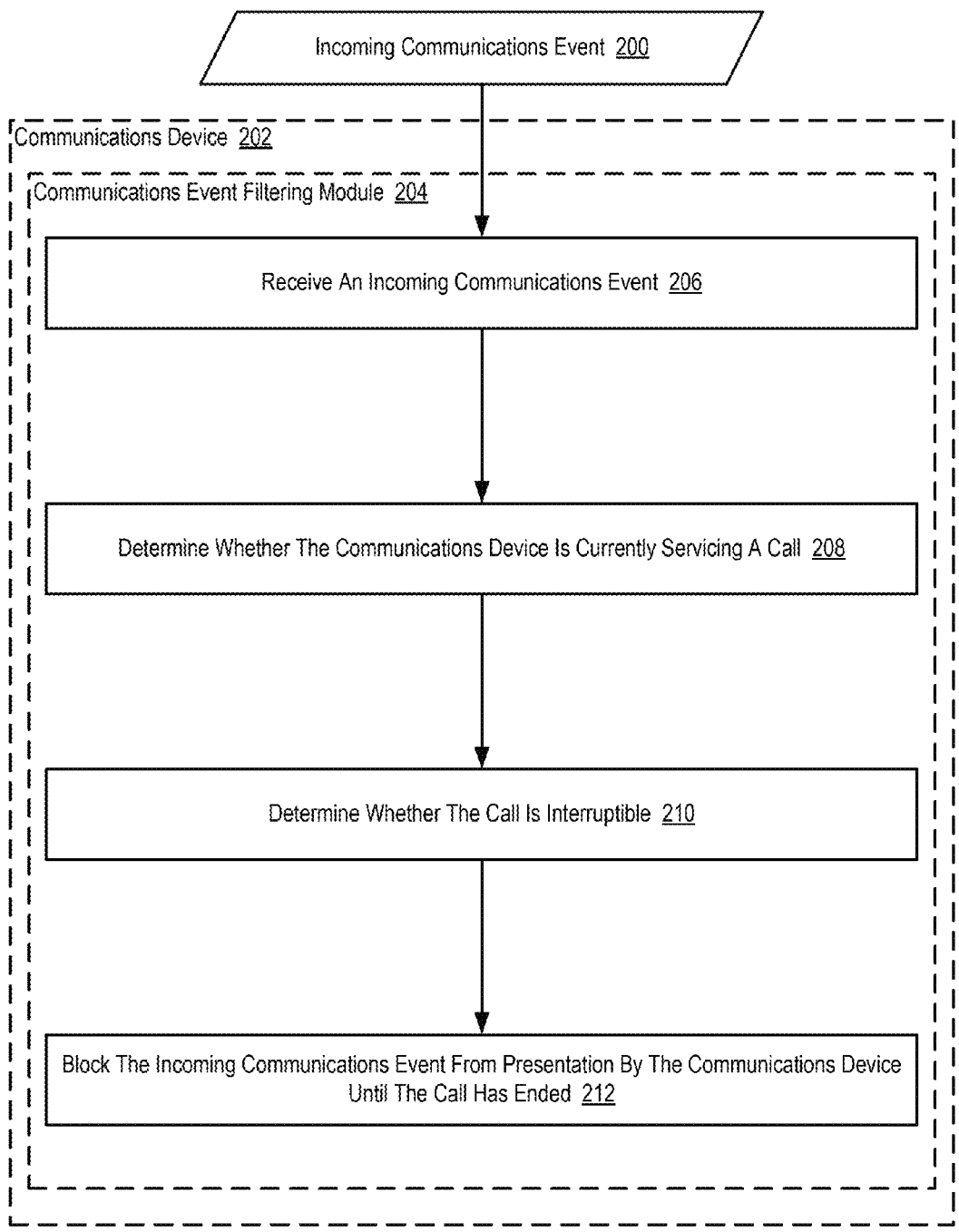
FIG. 2 sets forth a flow chart illustrating an example method for selectively filtering incoming communications events in a communications device according to embodiments of the present invention.

For further explanation, FIG. 2 sets forth a flow chart illustrating an example method for selectively filtering incoming communications events in a communications device (202) according to embodiments of the present invention. In the example method of FIG. 2, the communications device (202) may be embodied, for example, as a mobile phone, smartphone, and so on.

The example method of FIG. 2 includes receiving (206), by a communications event filtering module (204), an incoming communications event (200). In the example method of FIG. 2, the communications event filtering module (204) may be embodied as a module of computer program instructions executing on the communications device (202). Although the communications event filtering module (204) of FIG. 2 is depicted as residing within the communications device (202), readers will appreciate that the communications event filtering module (204) may alternatively be embodied as a module of computer program instructions executing on computing equipment, such as a server or switch, managed by a telecommunications service provider.

In the example method of FIG. 2, the incoming communications event (200) of FIG. 2 represents an attempt initiated by another device to exchange data communications information with the communications device (202). Examples of an incoming communications event (200) can include an incoming call initiated by another telecommunications device, an SMS message sent from another device, an electronic mail message sent from another device, and so on. In the example method of FIG. 2, the incoming communications event (200) may be received (206) by the communications device (202), for example, over a data communications network such an IP-based network, a telecommunications network, and so on.

The example method of FIG. 2 also includes determining (208), by the communications event filtering module (204), whether the communications device (202) is currently servicing a call. In the example method of FIG. 2, determining (208) whether the communications device (202) is currently servicing a call may be carried out, for example, by setting a variable monitored by the communications event filtering module (204) to a value indicating that the communications device (202) has accepted an incoming call or has initiated an outgoing call upon acceptance of or initiation of the call. In such an example, the communications event filtering module (204) may check the value of such a variable to determine whether the communications device (202) is being used for a phone call.

The example method of FIG. 2 also includes, responsive to determining that the communications device (202) is currently servicing a call, determining (208), by the communications event filtering module (204), whether the call is interruptible. In the example method of FIG. 2, a call may be 'interruptible' based on the importance of the call. For example, if a call is highly important the call may not be interruptible because the user of the communications device (202) is engaged in an important phone call and is not inclined to pause the important phone call in order to respond to the incoming communications event (200). If the call is not important, however, the call may be interruptible because the user of the communications device (202) is not engaged in an important phone call and may be inclined to pause or terminate the unimportant phone call in order to respond to the incoming communications event (200).

In the example method of FIG. 2, determining (208) whether the call is interruptible may be carried out, for example, by determining the importance of the call. Determining the importance of the call may be carried out through the use of a data repository stored within the communications device (202) that includes the identity of callers and callees whose calls are important. Such a repository may be specified by a user of the communications device (202). For example, the user of the communications device (202) may identity certain parties, such as a supervisor at work, a spouse, a family doctor, or other party as being a party whose calls should not be interrupted by incoming communications event (200). The user of the communications device (202) may identity parties whose calls should not be interrupted by incoming communications event (200), for example, by marking important parties in a contact list managed by the communications device (202), through the use of a special purpose user interface presented by the communications device (202), and so on.

The example method of FIG. 2 also includes, responsive to determining that the call is not interruptible, blocking (212), by the communications event filtering module (204), the incoming communications event (200) from presentation by the communications device (202) until the call has ended. In the example method of FIG. 2, blocking (212) the incoming communications event (200) from presentation by the communications device (202) until the call has ended may be carried out, for example, by sending an incoming call to voicemail or otherwise treating the incoming call as a missed call, by suppressing an alert that an SMS message has been received, by temporarily disabling notification capabilities of the communications device (202), and so on. The communications device (202) of FIG. 2 may determine that the call has ended, for example, through the use of a variable whose indicates whether the communications device (202) is being used for a phone call. For example, when a phone call terminates the communications event filtering module (204) may set such a variable to a value indicating that the communications device (202) is not being used for a phone call. In such an example, the communications event filtering module (204) may check the value of such a variable to determine whether the communications device (202) is being used for a phone call.

Figure 3:
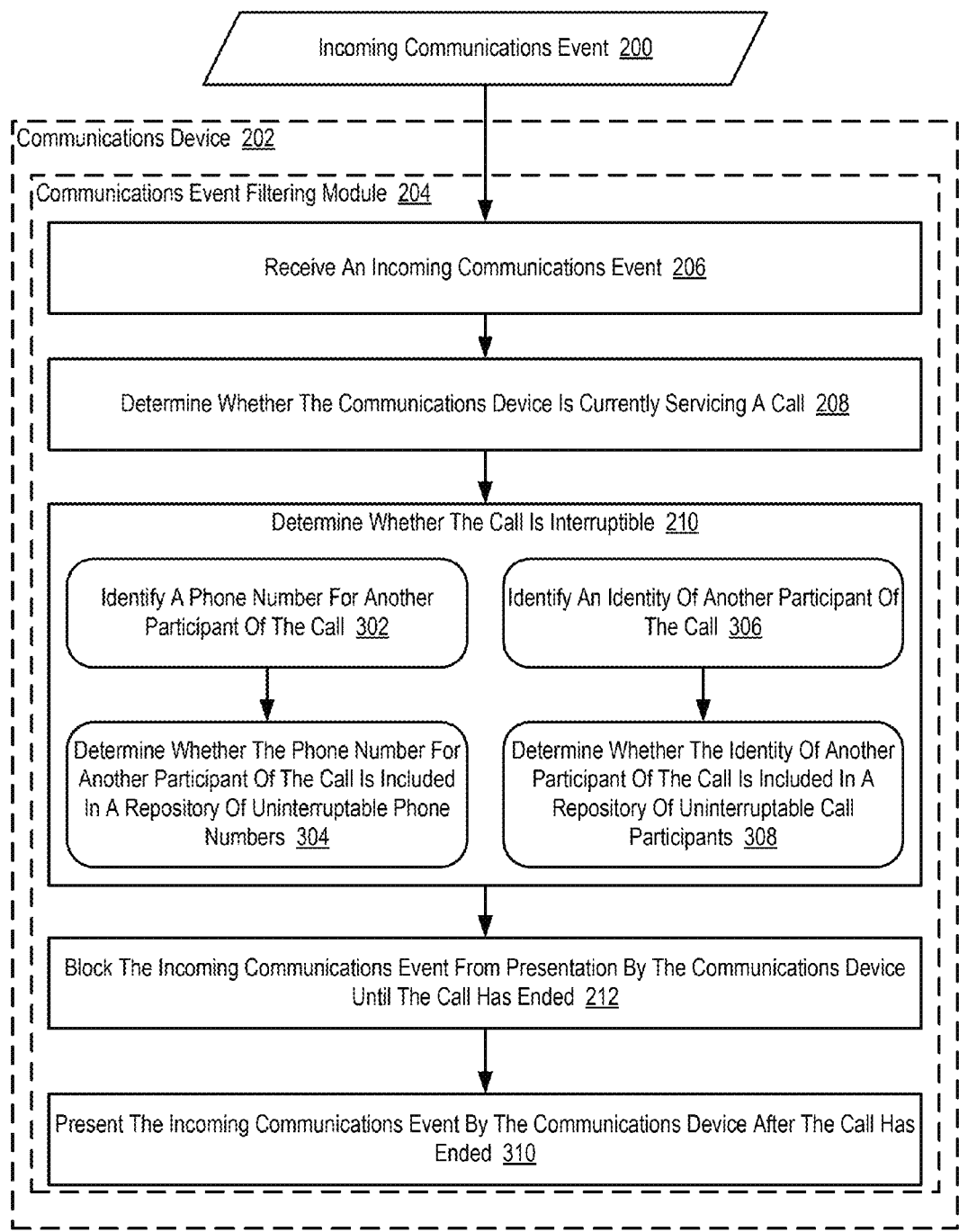
FIG. 3 sets forth a flow chart illustrating a further example method for selectively filtering incoming communications events in a communications device according to embodiments of the present invention.

For further explanation, FIG. 3 sets forth a flow chart illustrating a further example method for selectively filtering incoming communications events in a communications device (202) according to embodiments of the present invention. The example method of FIG. 3 is similar to the example method of FIG. 2 as it also includes receiving (206) an incoming communications event (200), determining (208) whether the communications device (202) is currently servicing a call, determining (208) whether the call is interruptible, and blocking (212) the incoming communications event (200) from presentation by the communications device (202) until the call has ended.

In the example method of FIG. 3, determining (208) whether the call is interruptible can include identifying (302), by the communications event filtering module (204), a phone number for another participant of the call. In the example method of FIG. 3, identifying (302) a phone number for another participant of the call may be carried out, for example, by examining caller ID information received as the call was incoming. The caller ID information may include, for example, the phone number from which the call originated, a name associated with the phone number from which the call originated, and so on. Identifying (302) a phone number for another participant of the call may also be carried out, for example, by inspecting the phone number dialed by the communications device (202) when initiating the call, by inspecting an entry in a contact list that was used to initiate the call, and so on.

In the example method of FIG. 3, determining (208) whether the call is interruptible can also include determining (304), by the communications event filtering module (204), whether the phone number for another participant of the call is included in a repository of uninterruptible phone numbers. In the example method of FIG. 3, the repository of uninterruptible phone numbers may be embodied, for example, as a data structure such as a table, linked list, array, or other data structure that includes one or more phone numbers. The phone numbers in the repository of uninterruptible phone numbers represent phone numbers that when called, or when a call is received from, have been designated as calls that are not to be interrupted by the incoming communications event (200). In such an example, when the communications device (202) is currently servicing a call in which the caller or callee is associated with a phone number contained in the repository of uninterruptible phone numbers, no incoming communications event (200) will cause the call to be interrupted.

In the example method of FIG. 3, determining (208) whether the call is interruptible can alternatively include identifying (306), by the communications event filtering module (204), an identity of another participant of the call. In the example method of FIG. 3, identifying (306) an identity of another participant of the call may be carried out, for example, by examining caller ID information received as the call was incoming. The caller ID information may include, for example, the phone number from which the call originated, a name associated with the phone number from which the call originated, and so on. Identifying (306) an identity of another participant of the call may also be carried out, for example, by inspecting an entry in a contact list that was used to initiate the call.

In the example method of FIG. 3, determining (208) whether the call is interruptible can also include determining (308), by the communications event filtering module (204), whether the identity of another participant of the call is included in a repository of uninterruptible call participants. In the example method of FIG. 3, the repository of uninterruptible call participants may be embodied, for example, as a data structure such as a table, linked list, array, or other data structure that includes one or names of people, businesses, and so on. The entries in the repository of uninterruptible call participants represent call participants that when called, or when a call is received from, have been designated as calls that are not to be interrupted by the incoming communications event (200). In such an example, when the communications device (202) is currently servicing a call in which the caller or callee is associated with an entry in the repository of uninterruptible call participants, no incoming communications event (200) will cause the call to be interrupted.

The example method of FIG. 3 also includes presenting (310) the incoming communications event (200) by the communications device (202) after the call has ended. In the example method of FIG. 3, presenting (310) the incoming communications event (200) by the communications device (202) after the call has ended may be carried out, for example, by enabling notification capabilities on the communications device (202), by storing information describing all incoming communications event (200) that were received during the call in a buffer maintained by the communications device (202) and presenting the contents of such a buffer via the communications device (202) upon completion of the call, and in other ways as will occur to those of skill in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of selectively filtering incoming communications events in a communications device, the method comprising:

receiving, by a communications event filtering module, an incoming communications event;

determining, by the communications event filtering module, whether the communications device is currently servicing a call;

responsive to determining that the communications device is currently servicing a call, determining, by the communications event filtering module, whether the call is interruptible, including:

identifying, by the communications event filtering module, an identity of another participant of the call; and determining, by the communications event filtering module, whether the identity of another participant of the call is included in a repository of uninterruptable call participants; and responsive to determining that the call is not interruptible, blocking, by the communications event filtering module, the incoming communications event from presentation by the communications device until the call has ended.

2. The method of claim 1 further comprising presenting the incoming communications event by the communications device after the call has ended.

3. The method of claim 1 wherein the incoming communications event is an incoming call.

4. The method of claim 1 wherein the incoming communications event is a short message service ('SMS') message.

5. The method of claim 1 wherein the incoming communications event is an electronic mail message.

6. A communications device, the communications device comprising a computer processor, a computer memory operatively coupled to the computer processor, the computer memory having disposed within it computer program instructions that, when executed by the computer processor, cause the communications device to carry out the steps of:

receiving, by a communications event filtering module, an incoming communications event;

determining, by the communications event filtering module, whether the communications device is currently servicing a call;

responsive to determining that the communications device is currently servicing a call, determining, by the communications event filtering module, whether the call is interruptible, including:

identifying, by the communications event filtering module, an identity of another participant of the call; and determining, by the communications event filtering module, whether the identity of another participant of the call is included in a repository of uninterruptable call participants; and responsive to determining that the call is not interruptible, blocking, by the communications event filtering module, the incoming communications event from presentation by the communications device until the call has ended.

7. The communications device of claim 6 further comprising computer program instructions that, when executed by the computer processor, cause the communications device to carry out the step of presenting the incoming communications event after the call has ended.

8. The communications device of claim 6 wherein the incoming communications event is an incoming call.

9. The communications device of claim 6 wherein the incoming communications event is a short message service ('SMS') message.

10. The communications device of claim 6 wherein the incoming communications event is an electronic mail message.

11. A computer program product for selectively filtering incoming communications events in a communications device, the computer program product disposed upon a computer readable medium, wherein the computer readable medium is not a signal nor a carrier wave, the computer program product comprising computer program instructions that, when executed, cause a communications device to carry out the steps of:

receiving, by a communications event filtering module, an incoming communications event;

determining, by the communications event filtering module, whether the communications device is currently servicing a call;

responsive to determining that the communications device is currently servicing a call, determining, by the communications event filtering module, whether the call is interruptible, including:

identifying, by the communications event filtering module, an identity of another participant of the call; and determining, by the communications event filtering module, whether the identity of another participant of the call is included in a repository of uninterruptable call participants; and responsive to determining that the call is not interruptible, blocking, by the communications event filtering module, the incoming communications event from presentation by the communications device until the call has ended.

12. The computer program product of claim 11 further comprising computer program instructions that, when executed, cause a communications device to carry out the step of presenting the incoming communications event by the communications device after the call has ended.

13. The computer program product of claim 11 wherein the incoming communications event is an incoming call.

14. The computer program product of claim 11 wherein the incoming communications event is a short message service ('SMS') message.

* * * * *